Nov. 20, 1928.
V. ARCHAOULOFF
1,692,107
DIRECT INJECTION FUEL ATOMIZER FOR INTERNAL COMBUSTION ENGINES
Filed Aug. 24, 1925
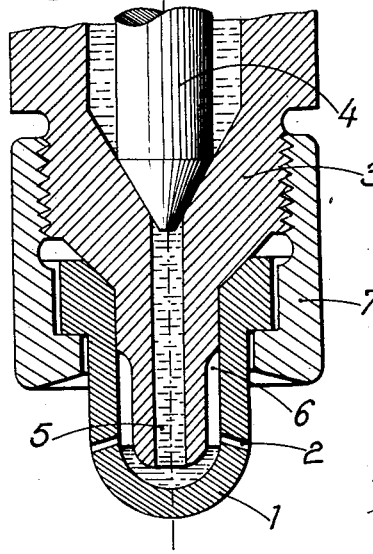
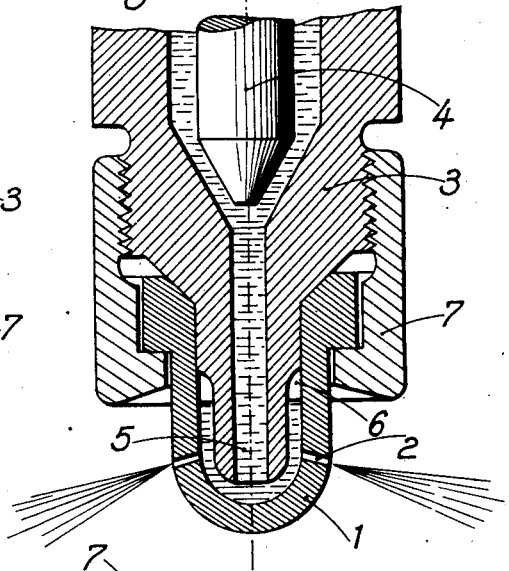
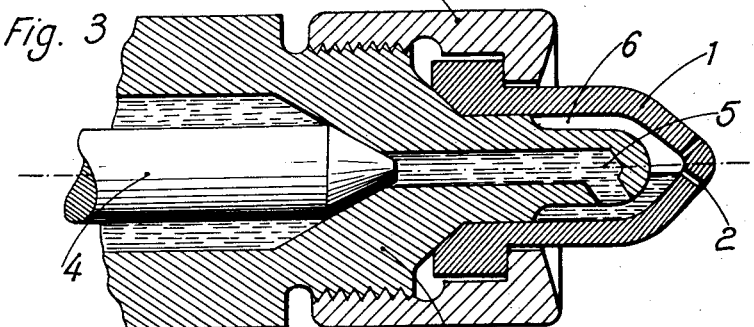
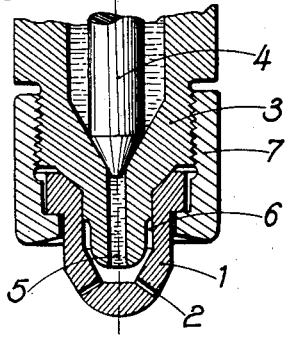

Patented Nov. 20, 1928.

1,692,107

UNITED STATES PATENT OFFICE.

VADIME ARCHAOULOFF, OF BOULOGNE-SUR-SEINE, FRANCE.

DIRECT-INJECTION FUEL ATOMIZER FOR INTERNAL-COMBUSTION ENGINES.

Application filed August 24, 1925, Serial No. 52,236, and in France September 17, 1924.

This invention relates to improvements in direct injection fuel atomizers for internal combustion engines, by which the defects of atomizers of this kind, as compared with compressed, air atomizers may be obviated.

It is known that in direct injection atomizers the inlet orifices having a very small diameter, are not scavenged by a jet of air, so that at the end of the injection fuel still flows giving rise to deposits of carbon which impair the efficient working of the atomizer.

In the atomizer, which is the subject of the present invention, a very powerful scavenging of the orifices of the atomizer is effected by compressed air before and after each injection of fuel.

In order that the invention may be understood, it will be described with reference to the accompanying drawings, in which Figure 1 is a vertical section of an atomizer according to the invention at rest; Figure 2 is a similar section to Figure 1, but during the injection period; Figure 3 is a section of a horizontal atomizer; Figure 4 shows a modified construction of the atomizer. The atomizer is shown at 1, and is provided with spraying orifices 2. The body of the injector is shown at 3 and comprises a conical seat blocked by the needle valve 4. The passage 5 admitting the liquid fuel affords communication between the injector and the atomizer and opens below the orifices 2, so that a seal joint is formed with an air pocket 6 above the orifices 2. A nut 7 fixes the atomizer 1 in position on the body 3 of the injector.

The operation of the atomizer is as follows.

From the start of the compression period in the working cylinder, the air from the compression chamber scavenges the orifices 2 by passing through them and enters the space 6 forming the air pocket. In this air pocket pressure continually rises, for it is always substantially the same as that in the compression chamber of the working cylinder up to the moment of injection of the fuel. At this moment the needle valve 4 is lifted (Fig. 2) and the fuel under an excessively high pressure enters the interior of the atomizer 1 by compressing the air contained in the pocket 6 at the same pressure causing spraying of the fuel through the orifices.

From the moment of closing of the needle valve 4, the air compressed in the pocket 6 expands and completes the atomization of the small quantity of liquid which remains above the orifices 2, and then powerfully scavenges these orifices, so that the level of the fuel is restored in the atomizer, as shown in Figure 1, in which the air contained in the pocket 6 is at atmospheric pressure.

In the case in which the diameter of the inlet passage 5 for the fuel does not exceed a certain diameter, the hydraulic joint to retain the fuel may be omitted.

There is shown in Figure 4 an arrangement in which this joint is omitted, the adhesion and viscosity of the liquid sufficing to keep the passage 5 filled.

Claims:

1. In direct injection atomizers for internal combustion engines, the combination, a valve controlled injector and a cup-like atomizer connected thereto and having spraying orifices positioned below the outlet of the injector so as to form a seal joint and an air pocket between the atomizer and the injector when the injector is shut off, substantially as and for the purposes set forth.

2. In direct injection atomizers for internal combustion engines, the combination, an injector body having a central fuel passage therethrough and a valve seat at the inner end thereof, a valve coacting with the seat, and a cup-like atomizer arranged about the outlet end of the injector body and provided with spraying orifices positioned below the outlet of the fuel passage so as to form a seal joint and an air pocket between the atomizer and the body of the injector when the valve is shut off, substantially as and for the purposes set forth.

In testimony whereof I hereunto affix my signature.

VADIME ARCHAOULOFF.